(12) United States Patent
Castelijn et al.

(10) Patent No.: US 11,002,463 B2
(45) Date of Patent: May 11, 2021

(54) SUSPENSION SYSTEM FOR SUPPORTING AN INFLATABLE AIR DUCT

(71) Applicant: Bosman Van Zaal B.V., Aalsmeer (NL)

(72) Inventors: Carolus Albertus Maria Castelijn, De Kwakel (NL); Frederick Jan Mantje, Hilversum (NL)

(73) Assignee: BOSMAN VAN ZAAL B.V., Aalsmeer (NL)

( * ) Notice: Subject to any disclaimer, the term of this patent is extended or adjusted under 35 U.S.C. 154(b) by 2 days.

(21) Appl. No.: 16/461,966

(22) PCT Filed: Nov. 18, 2016

(86) PCT No.: PCT/NL2016/050813
§ 371 (c)(1),
(2) Date: May 17, 2019

(87) PCT Pub. No.: WO2018/093245
PCT Pub. Date: May 24, 2018

(65) Prior Publication Data
US 2019/0323724 A1    Oct. 24, 2019

(51) Int. Cl.
*F16L 3/00*    (2006.01)
*F24F 13/02*   (2006.01)

(52) U.S. Cl.
CPC .............................. *F24F 13/0254* (2013.01)

(58) Field of Classification Search
CPC .. F24F 3/0254; F24F 13/0218; F24F 13/0245; F24F 13/0254
(Continued)

(56) References Cited

U.S. PATENT DOCUMENTS

| | | | | |
|---|---|---|---|---|
| 1,244,465 A | * | 10/1917 | Braly | ........................ F16L 3/14 |
| | | | | 248/61 |
| 1,261,008 A | * | 4/1918 | Braly | .................... F16L 11/122 |
| | | | | 138/107 |

(Continued)

FOREIGN PATENT DOCUMENTS

WO    2008/060770 A1    5/2008

OTHER PUBLICATIONS

International Search Report dated Aug. 11, 2017 issued in corresponding International Application No. PCT/NL2016/050813.

(Continued)

*Primary Examiner* — James F Hook
(74) *Attorney, Agent, or Firm* — Pillsbury Winthrop Shaw Pittman, LLP (57) ABSTRACT

Suspension system for supporting an inflatable air duct includes at least one support bracket arranged to support the inflatable air duct, the at least one support bracket being suspendable, wherein the at least one support bracket includes a first bracket component arranged to support a first side of the inflatable air duct; and a second bracket component arranged to support a second opposite side of the inflatable air duct. A first end of each of the first and second bracket components has a plurality of bends so as to provide at least one holding point to prevent the first and second bracket components from rotating in opposite direction towards each other around an axis in parallel with a longitudinal direction of the inflatable air duct.

20 Claims, 5 Drawing Sheets

(58) Field of Classification Search
USPC .................................................. 138/106, 107
See application file for complete search history.

(56) References Cited

U.S. PATENT DOCUMENTS

| | | | |
|---|---|---|---|
| 1,833,704 A | | 11/1931 | Bins |
| 1,838,623 A | | 12/1931 | Hersey, Jr. et al. |
| 2,034,928 A | * | 3/1936 | St John .................... H02G 7/10 |
| | | | 248/61 |
| 2,097,663 A | * | 11/1937 | Hersey, Jr. ................ E21F 1/04 |
| | | | 138/118 |
| 2,222,497 A | * | 11/1940 | Bins ........................ E21F 17/02 |
| | | | 138/107 |
| 3,357,088 A | | 12/1967 | Hoffman et al. |
| 6,280,320 B1 | | 8/2001 | Paschke et al. |
| 6,425,417 B1 | * | 7/2002 | Paschke .............. F24F 13/0218 |
| | | | 138/106 |
| 8,434,526 B1 | | 5/2013 | Pinkalla et al. |
| 2002/0155805 A1 | | 10/2002 | Paschke |
| 2008/0113610 A1 | | 5/2008 | Brown et al. |
| 2011/0000569 A1 | | 1/2011 | Lynch et al. |

OTHER PUBLICATIONS

Written Opinion of the International Searching Authority dated Aug. 11, 2017 issued in corresponding International Application No. PCT/NL2016/050813.
International Preliminary Report on Patentability dated May 21, 2019 issued in corresponding International Application No. PCT/NL2016/050813.

\* cited by examiner

SUSPENSION SYSTEM FOR SUPPORTING AN INFLATABLE AIR DUCT

CROSS-REFERENCE TO RELATED APPLICATIONS

This is the U.S. National Stage of PCT/NL2016/050813, filed Nov. 18, 2016, the contents of which is incorporated herein by reference in its entirety.

The invention relates to a suspension system for supporting an inflatable air duct.

Inflatable air ducts can for example be used in horticulture. Plants growing in greenhouses exude moisture, which needs to be drained away. This is generally done by blowing air through suspended air ducts. These air ducts are for example made of a sheet of flexible plastic and are provided with spaced apart openings through which the air can pass from within the air duct into the greenhouse. These air ducts can be relatively long, for example up to 100 m or longer. Prior art suspension systems for these inflatable air ducts in greenhouses generally comprise a plurality of support brackets, which support the air duct from the inside, and which reach through openings in the duct to be suspended on a suspension structure. The suspension structure may for example be a longitudinal suspension line hanging over, and in parallel with, a longitudinal centre line of the duct, or may be a plurality of transverse suspension lines which are transverse to the longitudinal direction of the duct. The suspension structure may for example also comprise hooks, wire and/or tubes instead of, or in addition to, a suspension line.

A problem with the prior art suspension systems is that the power station that is arranged to blow air through the duct, needs to run in a relatively high regime in order to keep the duct open over the entire length of the duct. This may cause the air in the greenhouse to become too dry, so that a vaporizing or moisturizing device is needed in the greenhouse as well. The power station for the air blowing cannot be started slowly because when the air pressure in the duct is too low, the air escapes via the openings at a first end of the duct near the power station, and the rest of the duct remains in a sagging position. So an initial relatively high power is needed to open the duct over the entire length. Even after the initial opening of the duct, the power station cannot be fine-tuned into a lower regime, as the pressure needs to be maintained to prevent the duct from sagging again.

In some patent publications, solutions to keep the duct open even at low blowing pressure are proposed, such as for example in patent publication US 2008/113610, disclosing an external rib cage for inflatable air ducts for use in utility buildings conveying conditioned air. The inflatable porous fabric tube is provided with a plurality of radially spaced pairs of loops along the tube at an outside thereof, which loops can be suspended on a series of hangers. An external suspension system for horticultural ducts may however take up a lot of space in height. Furthermore, it may be relatively expensive to provide horticultural ducts with such loops without easily and quickly leading to tearing of the inflatable tube.

Patent publication U.S. Pat. No. 8,434,526 B1 describes a air duct system having comprising an air duct having a pliable sidewall and an internal framework. The internal framework comprises a longitudinal shaft, a rib engaging an inner surface of the air duct and a plurality of spokes. Not only does the inner framework hinder the air flow within the duct, the framework is also far too complicated to have it installed in air ducts of considerable length, such as air ducts for greenhouses.

Document U.S. Pat. No. 3,357,088 discloses a method of attaching a hanger to an elongated flexible tube wall of closed circumference and substantial length. The duct is suspended from a wire by clips having preferably a isosceles triangular shape, of which the at least two equal sides extend outside the tube, while the base side extends inside the duct. The clip extends through two radially spaced apart openings in the duct, which have been reinforced with metal grommets and an additional layer of plastic. There are several disadvantages linked with this prior art suspension system. First of all, the base side of the clip may hinder the air flow through the tube and can cause turbulent flows. Secondly, the openings are being kept apart by the plastic clip that is being connected to the duct by the grommets, which is time consuming. Thirdly, providing the air duct with grommets and an additional layer of plastic, as well as attaching the hangers to the tube wall may be a rather complex, time-consuming and therefore costly job. On top of that, the air duct cannot be folded easily anymore.

It is an aim of the present invention to solve or alleviate one or more of the above-mentioned problems. Particularly, the invention aims at providing an improved suspension system for supporting an inflatable air duct which prevents the duct from sagging even in absence of sufficient air pressure. Advantageously, a relatively efficient suspension system which can be installed relatively easily and rapidly may be provided.

To this aim, according to a first aspect of the present invention, there is provided a suspension system for supporting an inflatable air duct characterized by the features of claim 1. In particular, the suspension system for supporting an inflatable air duct comprises at least one support bracket arranged to support the inflatable air duct. Said at least one support bracket is suspendable, wherein said at least one support bracket includes a first bracket component arranged to support a first side of the inflatable air duct, and a second bracket component arranged to support a second side of the inflatable air duct. A first end of each of said first and second bracket components comprises a plurality of bends such as to provide at least one holding point to prevent said first and second bracket components from rotating in opposite direction towards each other around an axis in parallel with a longitudinal direction of the inflatable air duct. By preventing said first and second bracket components from rotating towards each other, the support bracket can maintain a first side of the inflatable air duct at a distance from a second opposite side of said inflatable air duct, thus preventing the air duct from sagging in absence of sufficient air pressure. By further providing a suspension system comprising at least one two-part support bracket, the first and second bracket components can be relatively easily and quickly introduced into an inflatable duct.

Preferably, said at least one holding point can be a contact point between a bended first end of said first bracket component and a bended first end of said second bracket component. A moment of force of the first bracket component when suspended, for example on a suspension structure, can be counterbalanced by an opposite moment of force of the second bracket component when suspended on said suspension structure by the at least one contact point between the first ends of said first and second bracket components in which both moments of force cancel out.

Alternatively, it may be preferred that said at least one holding point can be a contact point between a bended first end of said first and/or second bracket component and at least one suspension structure, on which said at least one support bracket is suspendable. In particular, the bended first end of the first bracket component can contact a bottom side of the suspension structure, i.e. a side opposite a suspension side, when suspended on said at least one suspension structure. The contact point between said suspension structure and the first and/or second bracket component can hold the first and/or second bracket component such as to prevent rotation of said bracket component around an axis in parallel with a longitudinal direction of the inflatable air duct.

In a more preferred embodiment, said plurality of bends in the first end of each of said first and second bracket components can provide at least two additional holding points to prevent said support bracket from rotating around a substantially vertical axis, i.e. an axis substantially in parallel with a suspension axis or gravitational force axis. In this way, it can be prevented that a second end of the bracket component arranged to support a side of the inflatable air duct can turn around a vertical axis, for example over an angle towards a position in parallel with a longitudinal axis of the inflatable air duct, in which position said second end cannot support a side of the inflatable air duct anymore. Especially when one or both of said second ends of each of the first and second bracket component rotate, even over a relatively small angle, in opposite directions around said vertical axis, the brackets components are not in line anymore such that the moments of force of each of said bracket components cannot cancel out anymore. As a consequence, in absence of said additional holding points, the support bracket could be turned into a position in which the inflatable air duct could sag in case of insufficient air pressure.

Said at least two additional holding points can preferably be contact points between a bended first end of at least one of said two bracket components and two opposing lateral sides of at least one suspension structure, on which said at least one support bracket is suspendable, wherein said contact points are spaced apart in a longitudinal direction of said suspension structure, providing an easy way to hold the support bracket into a position in which the support bracket cannot be turned around a substantially vertical axis in order to avoid loss of alignment of the bracket components, and thus loss of the cancelling out of the moments of force of both bracket components.

It is preferred that a second end of each of said first and second bracket components can be substantially arcuate defining a curvature of the inflatable air duct in cross-section. An arcuate bracket, arranged to support a side of an inflatable air duct, can be manufactured relatively easily. Alternatively, the shape of the support bracket can be adapted to the cross-sectional shape of the inflatable air duct, which may also have a substantially rectangular or oval cross-section.

Advantageously, said plurality of bends in the first end of each of said first and second bracket components can provide at least one suspension bend arranged such that said first and second bracket component are suspendable on a suspension structure. Such a suspension bend is relatively easy to manufacture and can provide a solid suspension point to the support bracket. Alternatively, a suspension point could also be provided otherwise, for example by attaching, for instance by welding, a loop or hook to said support bracket.

More advantageously, said at least one suspension bend can be substantially U-shaped. The legs of the U-shape can for example be spaced-apart relatively narrowly, for example not substantially more than a diameter of a suspension structure. In this way, the suspension bend can contact the suspension structure on the inner bottom side between the two legs of the returned U-shape, and the legs of the U-shape can provide additional holding of the support bracket, which holding can be tighter the smaller the distance between the legs of the U-shape is.

Preferably, the bended first end of the first bracket component and/or the bended first end of the second bracket component can comprise at least two suspension bends, wherein said at least two suspension bends are spaced apart along said suspension structure. At least a second suspension bend spaced apart from a first suspension bend can provide a relatively stable support bracket, and can prevent rotation of the support bracket around a substantially vertical axis.

Further, the at least two suspension bends of the bended first end of the first bracket component can be more spaced-apart than the at least two suspension bends of the bended first end of the second bracket component, such that the at least two suspension bends of said second bracket component are located in between the at least two suspension bends of said first bracket component when suspended on said suspension structure. Such a support bracket can provide at least four suspension contact points between said support bracket and a suspension structure, providing a relatively solid support structure able to spread a weight of an inflatable air duct over the at least four suspension contact points. At the same time, the first bracket component and the second bracket component can keep a similar shape/structure, thus simplifying the manufacturing of said bracket components.

Also, said at least one holding point can preferably be a contact point between a bended first end of said second bracket component and a link between a first suspension bend and a second suspension bend of the first bracket component. This may provide for a relatively stable and simple connection.

Alternatively, the bended first end of the first bracket component can comprise a U-shaped holding bend arranged to receive the bended first end of the second bracket component. On top of providing holding to prevent rotation of the two bracket components towards each other around a first axis in parallel with a longitudinal direction of the air duct, the U-shaped holding bend can provide additional holding in a direction transverse to said first direction, such that the support bracket can easily be adapted from use with a suspension structure, e.g. a suspension line, in parallel with a longitudinal axis of the air duct to use with at least one, preferably a plurality of suspension structures, e.g. suspension lines, transverse to said longitudinal axis of the air duct. The adaptation of the support bracket can be limited to twisting the second ends of each of the first and second bracket components over an angle of substantially 90 degrees.

Advantageously, the bended first end of the first and/or second bracket component can comprise at least one spiral winding. A spiral winding can provide a suspension bend, as well as at least three holding points in a relatively easy and compact way. Lateral contact points between said first end of the bracket component and a suspension structure can prevent the bracket component from rotating around a vertical axis, while a contact point of between said bracket component and a bottom side of the suspension structure can prevent rotation around an axis in parallel with a longitudinal direction of the inflatable air duct.

It may be preferred that the first bracket component and the second bracket component have substantially the same shape, which can simplify the production of the support brackets, thus reducing their cost.

According to a second aspect of the invention, there is provided a suspension assembly for supporting an inflatable air duct comprising such a suspension system, further including at least one suspension structure on which said suspension system is suspendable. According to the space where the suspension system is to be suspended, a suspension structure in parallel with a longitudinal direction of the air duct may be chosen, for example in very wide spaces, or a plurality of suspension structures transverse to said longitudinal direction of the air duct may be preferred, for instance in very long spaces. Also a combination of longitudinal and transverse suspension lines is possible. Said suspension assembly may provide one of the above-mentioned advantages.

According to a third aspect of the invention, there is provided an air duct assembly comprising an inflatable air duct including spaced apart openings for blowing air from the duct through said openings, and a suspension system for supporting said inflatable air duct according to the first aspect of the invention. Such an air duct assembly can be advantageously used for example in greenhouses for horticulture, where they can provide substantial savings in energy needed to blow air through the air duct, and may be suspended on various types of suspension structures, providing one of the above-mentioned advantages. Inflatable air ducts for greenhouses are usually made of a flexible plastic such as polypropylene or polyethylene or any other suitable plastic as known to the person skilled in the art. Inflatable air ducts may also be made of a porous fabric, especially air ducts for aeration in utility buildings. The suspension system for supporting said inflatable air duct can be used for any type of inflatable air duct.

According to a fourth aspect of the invention, there is provided an air duct system comprising an inflatable air duct including spaced apart openings for blowing air from the duct through said openings, a suspension system for supporting said inflatable air duct according to the first aspect of the invention, and at least one suspension structure on which said inflatable air duct is suspendable via said suspension system. Said air duct system can provide one of the above-mentioned advantages.

According to a fifth aspect of the invention, there is provided a method of mounting a support bracket of a suspension system to an inflatable air duct comprising a plurality of longitudinally spaced-apart pairs of insert openings, as well as a plurality of air openings, wherein a second end of a first bracket component is introduced through one of a pair of insert openings into the inflatable air duct to support a first side of the inflatable air duct, while a first end of said first bracket component protrudes from the inflatable air duct, and wherein a second end of a second bracket component is introduced through the other of said pair of openings into the inflatable air duct to support a second opposite side of the inflatable air duct, while a first end of said second bracket component protrudes from said inflatable air duct. Next to providing one of the above-mentioned advantages, said method can provide a relatively easy, efficient and time-saving way to mount a support bracket of a suspension system to an inflatable air duct.

The present invention will be further elucidated with reference to figures of exemplary embodiments. Corresponding elements are designated with corresponding reference signs.

Figure 1:
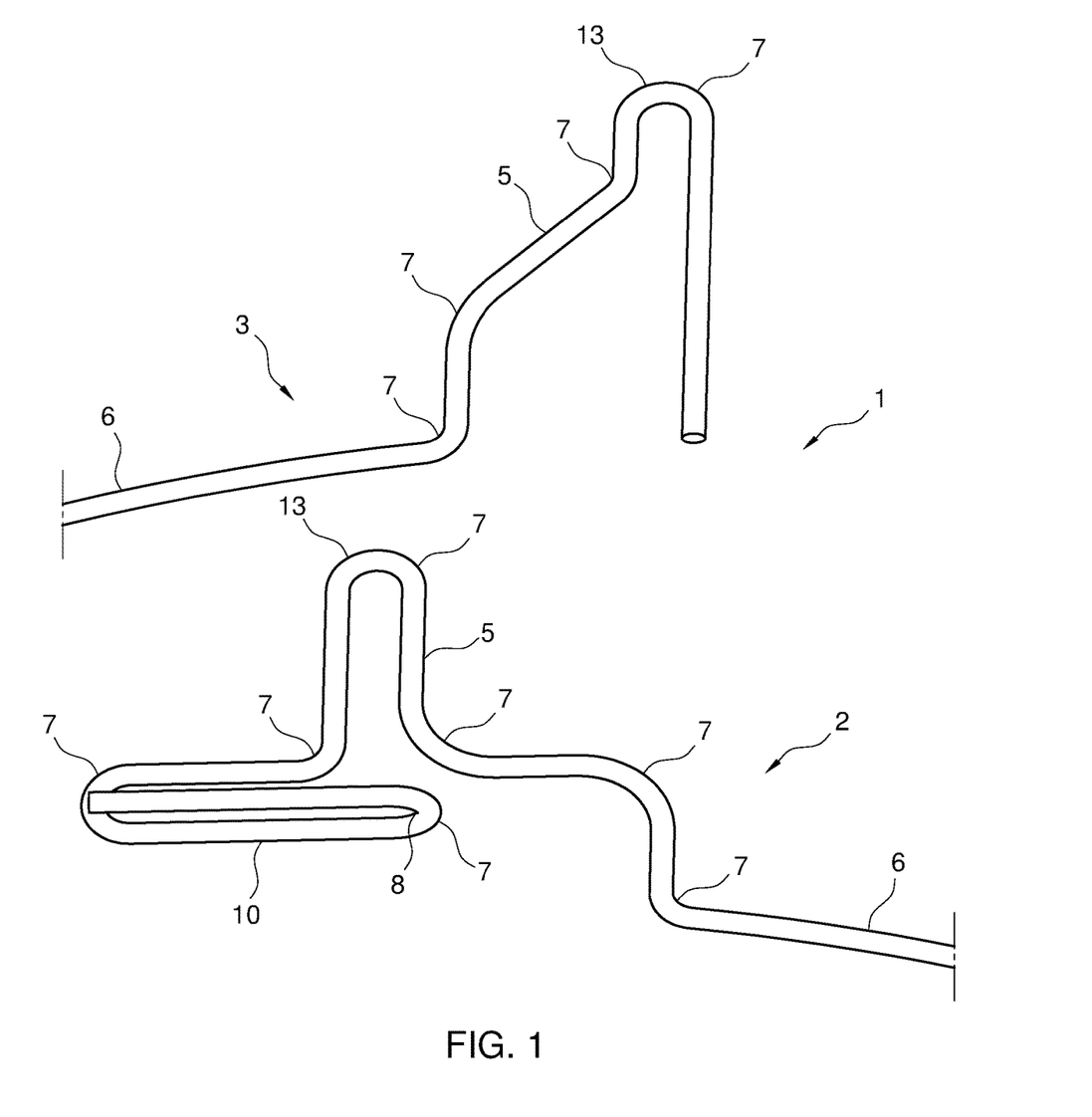
FIG. 1 shows a perspective front view of a first embodiment of a support bracket of a suspension system according to a first aspect of the invention.
Figure 2:
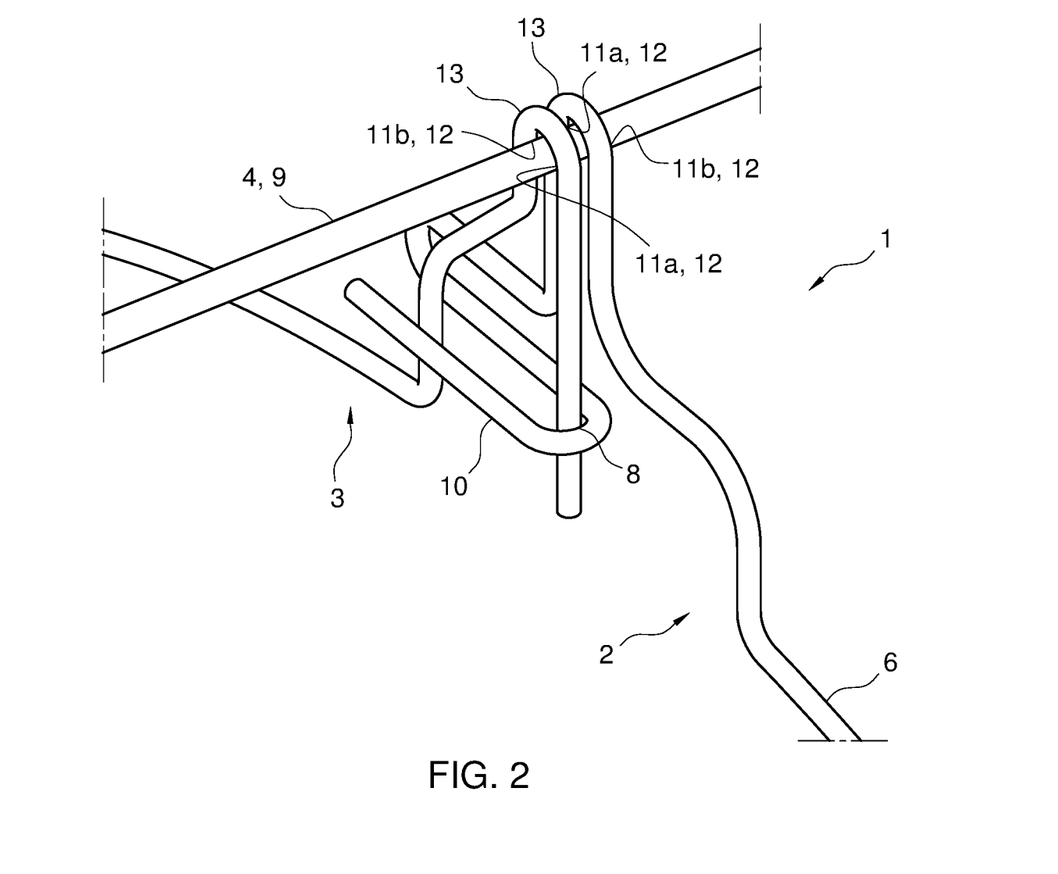
FIG. 2 shows a perspective view on the support bracket of FIG. 1 suspended on a suspension line.

FIG. 1 shows a perspective front view of a first embodiment of a support bracket 1 of a suspension system for supporting an inflatable air duct (not shown) according to a first aspect of the invention, and FIG. 2 shows a perspective view on the support bracket 1 of FIG. 1 suspended on a suspension line 4. The support bracket 1 comprises a first bracket component 2 arranged to support a first side of the inflatable air duct, and a second bracket component 3 arranged to support a second opposite side of the inflatable air duct. A first end 5 of each of said first and second bracket components 2, 3 comprises a plurality of bends, whereas a second end 6 of each of said first and second bracket components 2, 3 is substantially arcuate defining a curvature of the inflatable air duct in cross-section. The second end 6 may also have another shape according to the desired shape of the inflatable air duct, for example to support a substantially rectangular or oval cross-section of the air duct. The plurality of bends 7 provide at least one holding point 8 to prevent said first and second bracket components 2, 3 from rotating in opposite direction towards each other around an axis 9 in parallel with a longitudinal direction of the inflatable air duct. In the case of this first embodiment, at least one holding point 8 is a contact point between a bended first end 5 of said first bracket component 2 and a bended first end 5 of said second bracket component 3. More specifically, the bended first end 5 of the first bracket component 2 comprises a U-shaped holding bend 10 arranged to receive the bended first end 5 of the second bracket component 3. Said U-shaped holding bend 10 lies in a plane that is transverse to the plane in which lie the plurality of bends 7 of the first end 5 of the second bracket component 3. In this first embodiment, the suspension line 4 is in parallel with a longitudinal direction of the inflatable air duct (not shown). Alternatively, the support bracket 1 of FIG. 2 can be easily adapted to an embodiment to be suspended on at least one suspension line transverse to the longitudinal direction of the inflatable air duct, just by twisting the second ends 6 of each of the first and second bracket components 2, 3 over substantially 90 degrees. Due to the U-shaped holding bend 10, the two bracket components 2, 3 will still be prevented from rotating towards each other. Said plurality of bends 7 in the first end 5 of each of said first and second bracket components 2, 3 also provide at least two additional holding points 11 to prevent said support bracket 1 from rotating around a substantially vertical axis. Said at least two additional holding points 11a, 11b can be contact points between a bended first end 5 of at least one of said two bracket components 2, 3 and two opposing lateral sides 12 of said at least one suspension line 4, wherein said contact points are spaced apart in a longitudinal direction of said suspension line. In particular, the two holding points 11a provide a holding of the support bracket 1 to prevent its rotation around a vertical axis in one direction, whereas the two holding points 11b are two contact points preventing rotation of the support bracket 1 around the vertical axis in the opposite direction. Said plurality of bends 7 in the first end 5 of each of said first and second bracket components 2, 3 also provide at least one suspension bend 13 arranged such that said first and second bracket component 2, 3 are suspendable on the suspension line 4. Said at least one suspension bend 13 is substantially U-shaped, such that the suspension bend 13 can contact the suspension line 4 on the inner bottom side between the two legs of the returned U-shaped suspension bend 13. At least a first part near the bottom side of the U-shape has relatively tightly spaced-apart legs, for example such that the spacing between said two legs is not more than a diameter of the suspension line 4. In this way, the inner side of the legs of the U-shape can provide the lateral contact points with the suspension line 4, providing the additional holding points 11a, 11b. One of the legs of the U-shaped first end 5 of the second bracket component 3 can also recede from the other leg to widen the holding of said first end 5 of said second bracket component 3 in the U-shaped holding bend 10 of the first bracket component 2.

Figure 3:
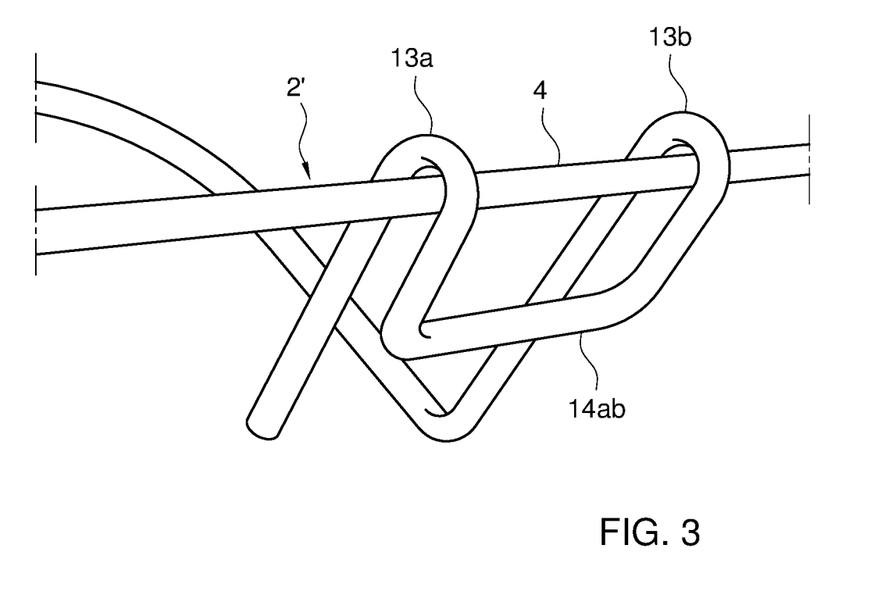
FIG. 3 shows a perspective view on a first bracket component, suspended on a suspension line, of a second embodiment of a support bracket of a suspension system according to a first aspect of the invention.
Figure 4:
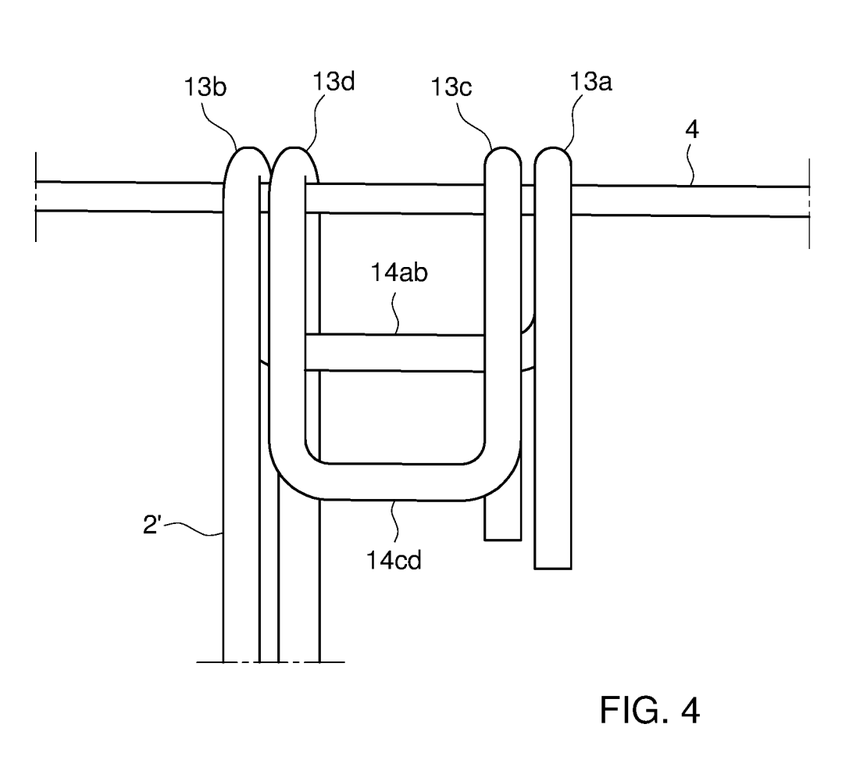
FIG. 4 shows a perspective side view on the bended first ends of the first and second bracket components of the support bracket of FIG. 3.
Figure 5:
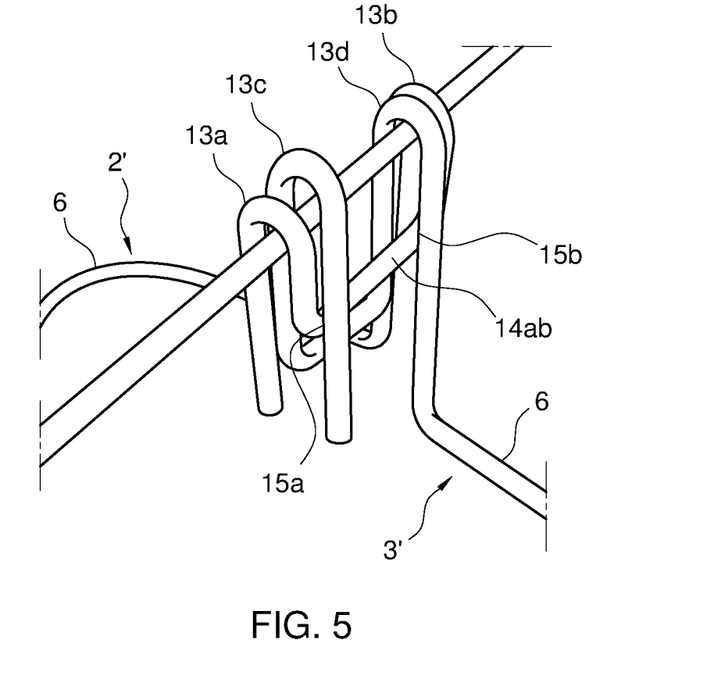
FIG. 5 shows a perspective view on the support bracket of FIG. 3.
Figure 6:
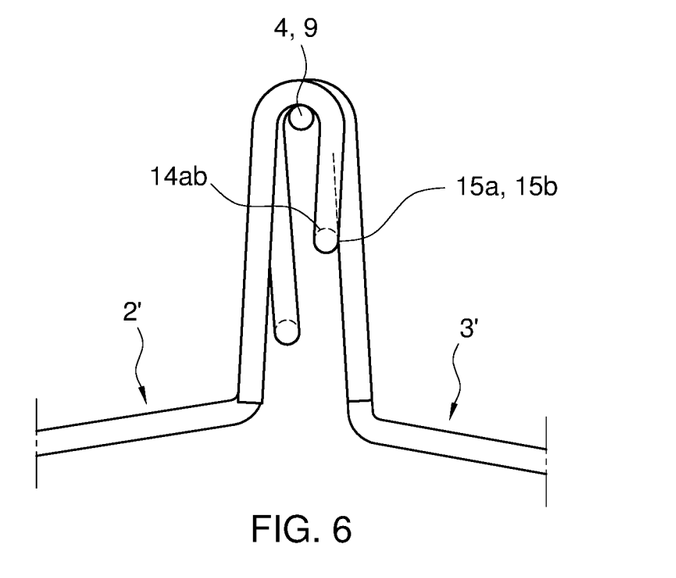
FIG. 6 shows a perspective side view seen along a suspension line on the bended first ends of the first and second bracket components of the support bracket of FIG. 3.

FIGS. 3 to 6 show different views on a second embodiment of a suspension system according to a first aspect of the invention. In particular, FIG. 3 shows a perspective view on a first bracket component 2', suspended on a suspension line 4, of a second embodiment of a support bracket 1' of a suspension system according to a first aspect of the invention. FIG. 4 shows a perspective side view on the bended first ends 5 of the first and second bracket components 2', 3' of the support bracket 1' of FIG. 3, and FIG. 5 shows another perspective view on the support bracket 1' of FIG. 3. Finally, FIG. 6 shows a perspective side view seen along a suspension line 4 on the bended first ends 5 of the first and second bracket components 2', 3' of the support bracket 1' of FIG. 3. In this second embodiment, the first end 5 of the first bracket component 2' comprises a first suspension bend 13a followed by a second suspension bend 13b, which two suspension bends are interconnected by a link 14 substantially in parallel with the suspension line 4. One could also describe the link 14 as a bottom side of a large U-shape, which bottom side is folded over a suspension line 4, such that each leg of this large U-shape becomes a U-shaped suspension bend 13a, 13b. Said two suspension bends 13a, 13b of one bracket component 2, 3 are spaced apart along said suspension line 4. As can be seen in FIGS. 4 and 5, the two suspension bends 13a, 13b of the bended first end 5 of the first bracket component 2' are more spaced-apart than the at least two suspension bends 13c, 13d of the bended first end 5 of the second bracket component 3', such that the at least two suspension bends 13c, 13d of said second bracket component 3' are located in between the at least two suspension bends 13a, 13b of said first bracket component 2' when suspended on said suspension line 4. Contrary to the first embodiment of FIGS. 1 and 2, the first bracket component 2' and the second bracket component 3' of this second embodiment have substantially the same shape, although the distance between the two spaced-apart suspension bends is different for the first or the second bracket component, as well as the distance between the link 14ab or 14cd and the respective suspension bends 13a, 13b or 13c, 13d. The at least one holding point to prevent said first and second bracket components 2', 3' from rotating in opposite direction towards each other around an axis 9 in parallel with a longitudinal direction of the inflatable air duct is provided by the at least one contact point between a bended first end 5 of said first bracket component 2' and a bended first end 5 of said second bracket component 3', more specifically by the at least one contact point between a bended first end 5 of said second bracket component 3' and a link 14ab between a first suspension bend 13a and a second suspension bend 13b of the first bracket component 2'. In the embodiment represented in FIGS. 3-6, there are two such contact points 15a, 15b, which are spaced-apart substantially by the same distance as the distance between the two suspension bends 13c, 13d of the second bracket component 3'. The position of the link 14cd with respect to the position of the link 14ab can be adapted in function of the equilibrium to be reached when the support bracket is suspended. In this second embodiment, due to the two U-shaped suspension bends 13a, 13b, 13c, 13d on each of the first and second bracket components 2', 3', which provide additional holding points through contact points between the bended first end 5 of at least one of said two bracket components 2', 3' and two opposing lateral sides of said at least one suspension line 4, wherein said contact points are spaced apart in a longitudinal direction of said suspension line 4, each of the first and second bracket components 2', 3' are individually prevented from rotating around a substantially vertical axis. Contrary to the first embodiment shown in FIGS. 1-2, the second embodiment of the suspension system can only be used with a suspension line which is arranged in parallel with a longitudinal direction of the inflatable air duct.

Figure 7:
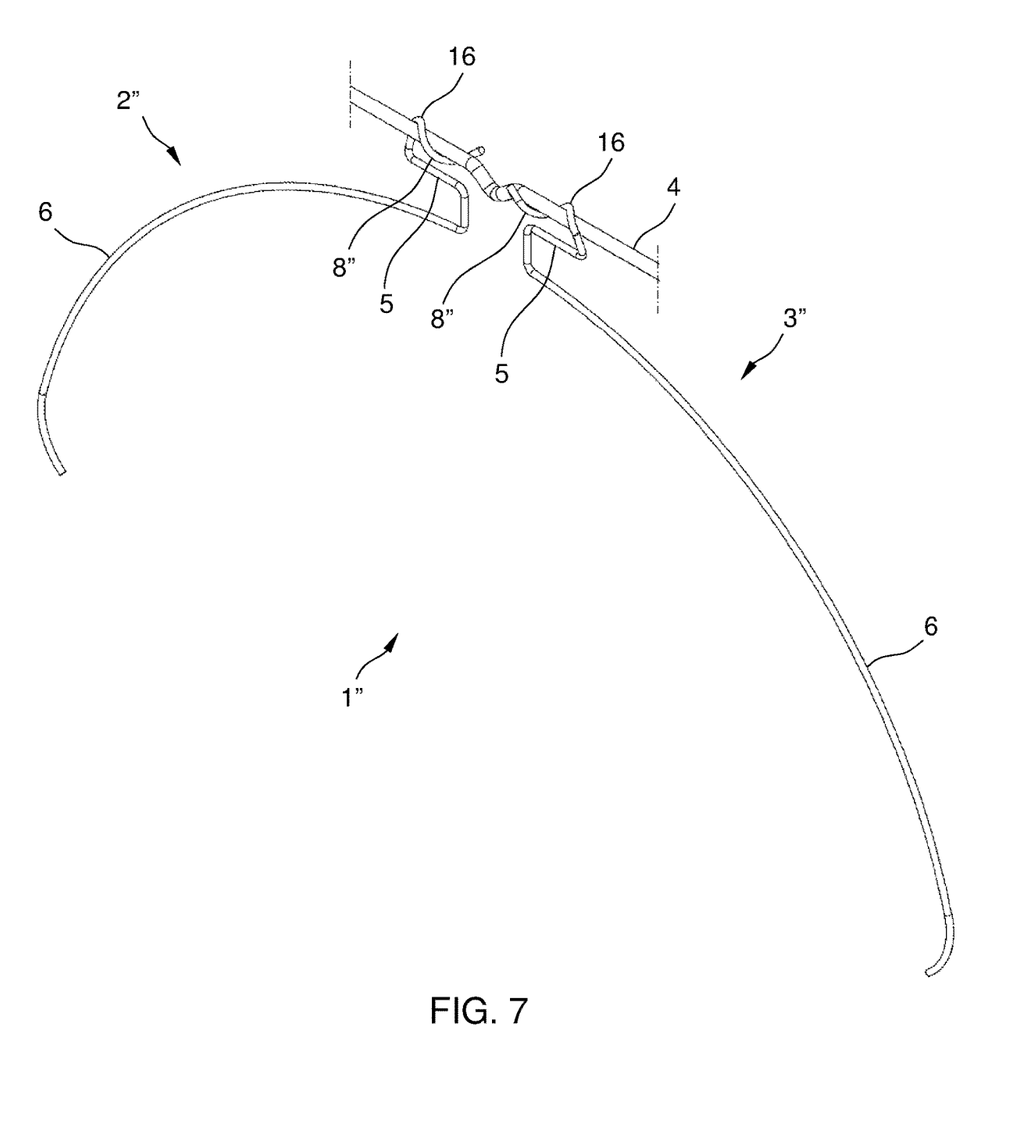
FIG. 7 shows a perspective view on a third embodiment of a support bracket of a suspension system according to a first aspect of the invention suspended on a suspension line.

FIG. 7 shows a perspective view on a third embodiment of a support bracket of a suspension system according to a first aspect of the invention suspended on a suspension line. A suspension system comprising a plurality of support brackets 1" according to this third embodiment can only be suspended on a plurality of suspension lines 4 transverse to a longitudinal direction of the inflatable air duct. The at least one support bracket 1" includes a first bracket component 2" arranged to support a first side of the inflatable air duct, and a second bracket component 3" arranged to support a second opposite side of the inflatable air duct. The first bracket component 2" and the second bracket component 3" have substantially the same shape, and are even substantially the same, such that a single type of bracket component can be manufactured for use on a first and a second side of the inflatable air duct. The bended first end 5 of the first and/or second bracket component 2", 3" comprises at least one spiral winding 16, arranged to be wound around one of the plurality of suspension lines 4. Part of the at least one spiral winding 16 can provide a suspension bend arranged such that said first and second bracket component are suspendable on the suspension line 4. The at least one spiral winding 16 also provides a holding point 8" to prevent said first and second bracket components 2", 3" from rotating in opposite direction towards each other around an axis in parallel with a longitudinal direction of the inflatable air duct. Said holding point 8" is a contact point between a bended first end of said first and/or second bracket component 2", 3" and said at least one suspension line, more specifically a contact point with a bottom side of the at least one suspension line. The at least one spiral winding 16 can further provide at least two additional holding points to prevent said support bracket from rotating around a substantially vertical axis, which at least two additional holding points are contact points between a bended first end 5 of at least one of said two bracket components 2", 3" and two opposing lateral sides of said at least one suspension line 4, said contact points being spaced apart in a longitudinal direction of said suspension line 4. The at least one spiral winding 16 can thus combine in a single winding of at least 180 degrees a suspension bend, a holding point characterizing the invention, as well as two additional spaced-apart lateral holding points to avoid vertical rotation of the support bracket. The bracket components could also comprise more than one spiral winding, for example for more stability. Contrary to the previous embodiments, a first or second bracket component of this third embodiment of a support bracket does not need contact with, or the presence of, the other bracket component to support a side of the inflatable air duct. Each bracket component can independently support a side of the inflatable air duct.

The support bracket components can be made from metal wire that is being bended or folded, but can also be made from plastic or any other suitable material. The bracket components can even be made from a metal plate which can be shaped, by folding, deep drawing or any other method, and which can afterwards be cut into small slices. Alternatively, the bracket components can be injection moulded or 3D-printed. Many variants are possible.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

The invention claimed is:

1. Suspension system for supporting an inflatable air duct comprising at least one support bracket arranged to support the inflatable air duct, said at least one support bracket being suspendable, wherein said at least one support bracket includes a first bracket component arranged to support a first side of the inflatable air duct, and a second bracket component arranged to support a second opposite side of the inflatable air duct, wherein a first end of each of said first and second bracket components comprises a plurality of bends so as to provide at least one holding point to prevent said first and second bracket components from rotating in opposite direction towards each other around an axis in parallel with a longitudinal direction of the inflatable air duct, wherein said plurality of bends in the first end of each of said first and second bracket components provide at least one suspension bend arranged such that said first and second bracket component are suspendable on at least one suspension structure.

2. Suspension system according to claim 1, wherein said at least one holding point is a contact point between a bended first end of said first bracket component and a bended first end of said second bracket component.

3. Suspension system according to claim 1, wherein said at least one holding point is a contact point between a bended first end of said first and/or second bracket component and the at least one suspension structure, on which said at least one support bracket is suspendable.

4. Suspension system according to claim 1, wherein said plurality of bends in the first end of each of said first and second bracket components provide at least two additional holding points to prevent said support bracket from rotating around a substantially vertical axis.

5. Suspension system according to claim 4, wherein said at least two additional holding points are contact points between a bended first end of at least one of said two bracket components and two opposing lateral sides of the at least one suspension structure, on which said at least one support bracket is suspendable, wherein said contact points are spaced apart in a longitudinal direction of the at least one suspension structure.

6. Suspension system according to claim 1, wherein a second end of each of said first and second bracket components is substantially arcuate defining a curvature of the inflatable air duct in cross-section.

7. Suspension system according to claim 1, wherein said at least one suspension bend is substantially U-shaped.

8. Suspension system according to claim 1, wherein the bended first end of the first bracket component and/or the bended first end of the second bracket component comprise at least two suspension bends, wherein said at least two suspension bends are spaced apart along said at least one suspension structure.

9. Suspension system according to claim 8, wherein the at least two suspension bends of the bended first end of the first bracket component are more spaced-apart than the at least two suspension bends of the bended first end of the second bracket component, such that the at least two suspension bends of said second bracket component are located in between the at least two suspension bends of said first bracket component when suspended on said at least one suspension structure.

10. Suspension system according to claim 9, wherein said at least one holding point is a contact point between a bended first end of said second bracket component and a link between a first suspension bend and a second suspension bend of the first bracket component.

11. Suspension system according to claim 1, wherein the bended first end of the first bracket component comprises a U-shaped holding bend arranged to receive the bended first end of the second bracket component.

12. Suspension system according to claim 1, wherein the bended first end of the first and/or second bracket component comprises at least one spiral winding.

13. Suspension system according to claim 1, wherein the first bracket component and the second bracket component have substantially the same shape.

14. Suspension assembly for supporting an inflatable air duct comprising a suspension system according to claim 1, further including at least one suspension structure on which said suspension system is suspendable.

15. Suspension assembly according to claim 14, wherein said at least one suspension structure is a suspension line arranged to be in parallel with a longitudinal direction of said inflatable air duct.

16. Suspension assembly according to claim 14, wherein said at least one suspension structure is arranged to be transverse to a longitudinal direction of said inflatable air duct.

17. Suspension assembly according to claim 16, wherein the at least one suspension structure is a plurality of suspension lines.

18. Air duct assembly comprising
an inflatable air duct including spaced apart openings for blowing air from the duct through said openings;
a suspension system for supporting said inflatable air duct according to claim 1.

19. Air duct system comprising
an inflatable air duct including spaced apart openings for blowing air from the duct through said openings;
a suspension system for supporting said inflatable air duct according to claim 1;
at least one suspension structure on which said inflatable air duct is suspendable via said suspension system.

20. Method of mounting the at least one support bracket of the suspension system according to claim 1 to an inflatable air duct comprising a plurality of longitudinally spaced-apart pairs of insert openings, as well as a plurality of air openings, wherein a second end of a first bracket component is introduced through one of a pair of insert openings into the inflatable air duct to support the first side of the inflatable air duct, while the first end of said first bracket component protrudes from the inflatable air duct, and wherein a second end of a second bracket component is introduced through the other of said pair of openings into the inflatable air duct to support a second opposite side of the inflatable air duct, while the first end of said second bracket component protrudes from said inflatable air duct.

* * * * *